July 13, 1926.

T. A. DOHERTY ET AL 1,592,185

BRAKING MECHANISM

Filed June 23, 1923

Inventors
Thomas A. Doherty
and Raymond C. Woodruff,
By Butler & Denny
Attorneys.

Patented July 13, 1926.

1,592,185

UNITED STATES PATENT OFFICE.

THOMAS A. DOHERTY AND RAYMOND C. WOODRUFF, OF PHILADELPHIA, PENNSYLVANIA.

BRAKING MECHANISM.

Application filed June 23, 1923. Serial No. 647,218.

Our invention is designed to provide improved braking mechanism having a plurality of brake shoes each radially movable against the annular face of a brake drum by a cam block having integral shoulders engaging the shoes, so as to apply uniform pressure throughout substantially the entire surfaces of the braking members without the noise, wear, and breakage, incident to the use of previous devices.

In its preferred form, our invention comprises a plurality of radially movable brake shoes having arcuate bearing faces symmetrically arranged so as to form a substantially complete circle conforming with the bearing surface of a brake drum, the shoes having inner bearing surfaces so disposed as to lie in the path of rotation of the integral cam shoulders of a journalled block having within the periphery thereof a toothed collar engaged by a journalled gear, the operation of which rotates the block to expand the shoes against the drum. The shoes are normally retracted and held out of engagement with the drum by springs connecting the several shoes and acting to draw them toward a common center, and the inner faces of the shoes when so contracted preferably forming an outline similar to the outline of the expanding block which lies between them.

The characteristic features of our improvements will more fully appear from the following description and the accompanying drawings in illustration of a preferred embodiment of our invention.

Figure 1:
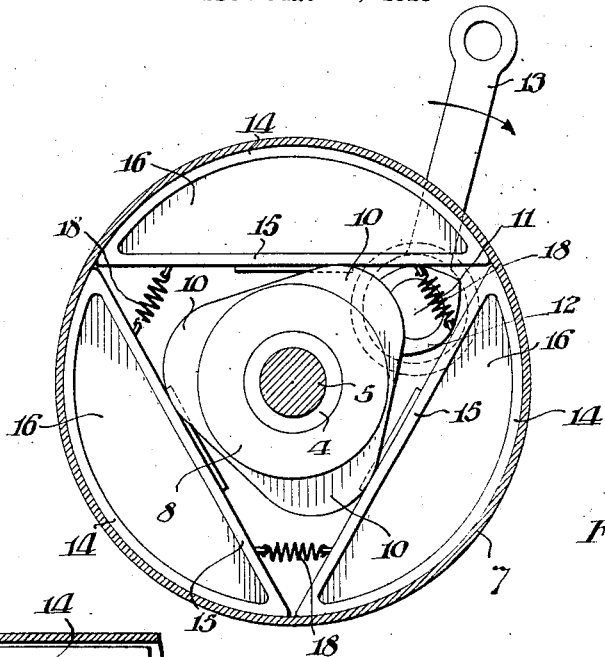
Figure 4:
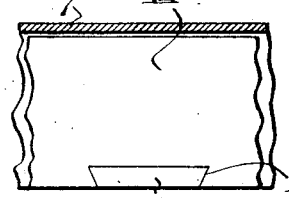
Figure 2:
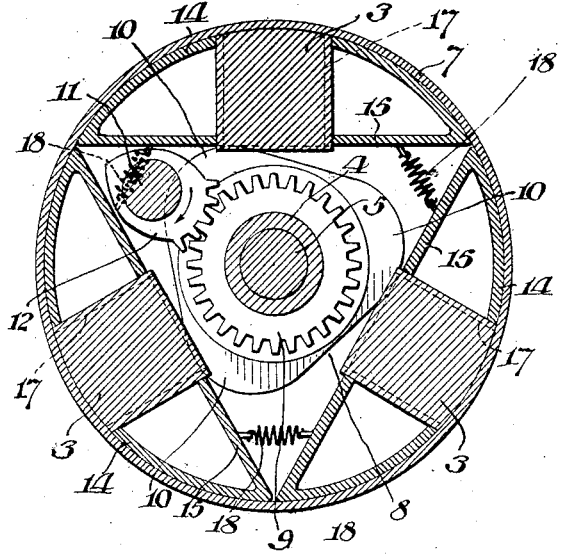
Figure 3:
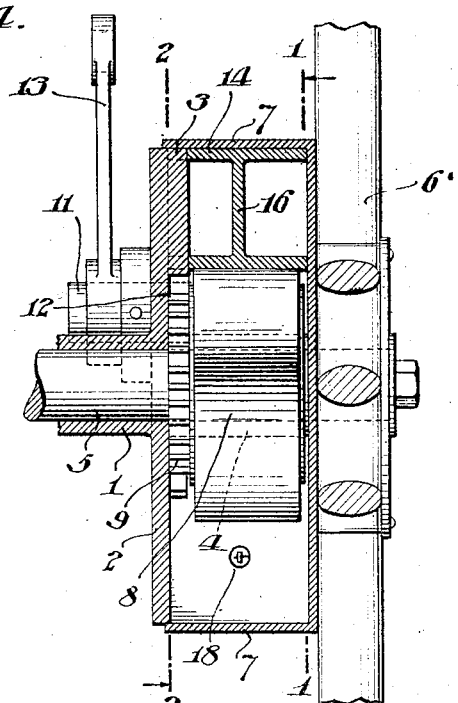

In the drawings, Fig. 1 is a vertical sectional view of apparatus embodying our invention taken on the line 1—1 of Fig. 3; Fig. 2 is a vertical sectional view thereof taken on the line 2—2 of Fig. 3; Fig. 3 is a vertical transverse sectional view of the apparatus applied to a vehicle wheel and axle housing; and Fig. 4 is a fragmentary detail view of the connection between the brake shoes and dust plate.

As illustrated in the drawings, a vehicle axle housing 1 is provided with the plate 2 on which are fixed radial beveled tenons 3 and a hollow hub 4 through which a spindle 5 passes to drive the wheel 6; an annular brake drum 7, registering with the plate 2, being fixed to the wheel 6.

A block 8 is journalled on the hub 4 and is provided with a toothed collar 9 within the periphery of the block and bearing against the plate 2, thereby spacing the body of the block from the plate and preventing engagement of the integral cam shoulders 10 of the block with the tenons 3. A shaft 11, journalled in the plate 2, has fixed thereon a segmental gear 12, engaging the toothed collar 9; a lever 13 being fixed on the shaft 11 exterior to the plate 2 for rocking the block 8 through the meshing gears.

A plurality of similar brake shoes are disposed within the housing formed by the drum 7 and plate 2, each shoe comprising an arcuate bearing member or flange 14, a chord bearing member or flange 15 connecting the ends of the flange 14, and a web 16 connecting and transmitting thrust between the flanges. The flanges 14 and 15 contain undercut ways 17 for engagement with the beveled tenons 3, so that the shoes are movable only radially with respect to the annular surface of the drum 7.

Each shoe is connected with two other shoes by coiled springs 18 which tend to draw the shoes toward a center and away from the brake drum.

It will be understood that the block 8 is normally so positioned that its sides lie substantially parallel with and within the similar contour formed by the shoe flanges 15, the shoes being drawn inward by the springs 18. When the lever 13 is rocked, in any suitable manner, the segmental gear 12 partially rotates the toothed collar 9 to rock the integral cam shoulders 10 into engagement with the faces of the bearings 15 of the shoes, which are thereby thrust outward radially against the inner bearing surface of the drum 7, and uniform braking is effected throughout the entire peripheries of the braking members. Should it be desirable for any reason to adjust the relationship of the block 8 with the shoes or with the gear 12, such block may be readily withdrawn from its hub and turned sufficiently to effect the desired adjustment, then restored to its hub with the gear 12 in engagement with appropriate teeth of the collar 9.

Having described our invention, we claim:

1. Braking mechanism comprising a face plate, a drum rotatable relatively to said plate, a plurality of brake shoes connected with said plate and radially movable thereon into and out of engagement with said drum, a hub, a block mounted on said hub and having integral cam shoulders and teeth within the periphery thereof, a shaft journalled in said plate and having teeth thereon engaging teeth of said block to rock said shoulders into and out of engagement with said shoes.

2. Braking mechanism comprising a plate, a drum, brake shoes radially movable over said plate into engagement with said drum, and a journalled block having cams engaging said shoes, said block having a toothed collar within the periphery of said cams and adjacent to said plate, and a gear engaging said toothed collar, for rocking said cams.

In testimony whereof we have hereunto set our names this 15th day of May, 1923.

THOMAS A. DOHERTY.
RAYMOND C. WOODRUFF.